United States Patent
Knapp et al.

(10) Patent No.: US 6,816,345 B1
(45) Date of Patent: Nov. 9, 2004

(54) MAGNETORESISTIVE SENSORS HAVING SUBMICRON TRACK WIDTHS AND METHOD OF MAKING

(75) Inventors: Kenneth E. Knapp, Livermore, CA (US); Ronald A. Barr, Mountain View, CA (US); Myron R. Cagan, Saratoga, CA (US); Mark D. Thomas, Hollister, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 157 days.

(21) Appl. No.: 09/963,288

(22) Filed: Sep. 24, 2001

(51) Int. Cl.[7] .................................................. G11B 5/39
(52) U.S. Cl. ........................................................ 360/322
(58) Field of Search .............................. 360/322, 324.1, 360/324.11, 324.12

(56) References Cited

U.S. PATENT DOCUMENTS

| | | | |
|---|---|---|---|
| 5,147,740 A | 9/1992 | Robinson | 430/5 |
| 5,847,904 A | * 12/1998 | Bharthulwar | 360/322 |
| 6,108,176 A | * 8/2000 | Yokoyama | 360/324.11 |
| 6,156,665 A | 12/2000 | Hamm et al. | 438/706 |
| 6,218,056 B1 | 4/2001 | Pinarbasi et al. | 430/5 |
| 6,228,276 B1 | 5/2001 | Ju et al. | 216/22 |
| 6,229,678 B1 | 5/2001 | Xue et al. | 360/327.22 |
| 6,235,342 B1 | 5/2001 | Xue et al. | 427/131 |
| 6,433,971 B1 | * 8/2002 | Sato et al. | 360/322 |
| 6,515,837 B1 | * 2/2003 | Hamakawa et al. | 360/319 |
| 6,570,743 B1 | * 5/2003 | Garfunkel et al. | 360/322 |
| 6,583,970 B1 | * 6/2003 | Sakata | 360/324.12 |

FOREIGN PATENT DOCUMENTS

| | | | |
|---|---|---|---|
| JP | 5-189727 | * | 7/1993 |
| JP | 7-29122 | * | 1/1995 |
| JP | 7-272221 | * | 10/1995 |

* cited by examiner

*Primary Examiner*—David L. Ometz
(74) *Attorney, Agent, or Firm*—Mark Lauer; Silicon Edge Law Group LLP

(57) ABSTRACT

Methods for reducing feature sizes of devices such as electromagnetic sensors are disclosed. A track width of a MR sensor is defined by a mask having an upper layer with a reduced width and a lower layer with a further reduced width. Instead of or in addition to being supported by the lower layer in the area defining the sensor, the upper layer is supported by the lower layer in areas that do not define the sensor width. In some embodiments the upper layer forms a bridge mask, supported at its ends by the lower layer, and the lower layer is completely removed over an area that will become a sensor. Also disclosed is a mask having more than two layers, with a bottom layer completely removed over the sensor area, and a middle layer undercut relative to a top layer.

20 Claims, 10 Drawing Sheets

MAGNETORESISTIVE SENSORS HAVING SUBMICRON TRACK WIDTHS AND METHOD OF MAKING

BACKGROUND

The present invention relates to devices, such as magnetoresistive (MR) sensors or electronic circuits, having submicron features that are manufactured with a mask that is undercut, with the undercut allowing the mask and overlying materials to be lifted off.

FIG. 1 shows a prior art step in the formation of a conventional MR sensor for a hard disk drive. Over a wafer substrate 20 a magnetic shield layer 22 has been formed, either directly on the substrate or on an intermediate layer, not shown. Atop the shield layer 22 a first read gap layer 24 of dielectric materials has been formed, and atop the read gap layer 24 a plurality of MR sensor layers 26 has been formed. A bi-layer mask 25 has been formed of layers 27 and 28, and after photolithographic patterning, layer 27 has been chemically removed relative to layer 28, forming undercut edges 30 and 33. A directional removal step such as ion beam etching (IBE) has been performed to create edges 35 and 36 of the sensor layers 26, the IBE also removing part of the read gap layer 24.

In FIG. 2 a bias layer 40 has been sputter deposited, followed by an electrically conductive lead layer 44. The electrically conductive bias layer 40 and lead layer 44 abut the edges 35 and 36 of the sensor layers 26 to stabilize magnetic domains of the sensor layers and provide electric current to the sensor layers. The bias layer 40 and lead layer 44 are also deposited atop mask layer 25, but due to undercuts 30 and 33, a chemical etch can be applied that dissolves mask layer 27 allows the mask and the layers 40 and 44 atop the mask to be lifted off.

FIG. 3 shows a cross-sectional view of the sensor layers 26, bias layer 40 and lead layer 44 after the mask has been lifted off. This cross-sectional view of the sensor layers is essentially that which will be seen from a media such as a disk, after the wafer 20 has been diced and the die or head containing the sensor layers 26 has been positioned adjacent the media in a drive system. An active width or track width $TW_0$ of the sensor layers 26 between lead layers 44 may be in a range between one-half micron and one micron, corresponding to a resolution at which the sensor layers can read magnetic tracks in the media.

FIG. 4 is a top view of the sensor layers 26, bias layer 40 and lead layer 44 of FIG. 3. The wafer and thin film layers will, as mentioned above, be diced along the dashed line 3—3 that indicates the cross-sectional view of FIG. 3. The sensor layers 26 shown in FIG. 4 have been trimmed along back edges 50 and 52 distal to the dashed line 3—3 by conventional masking and IBE such as ion milling, not shown. The leads 44 are typically so much thicker than the sensor layers 26 that the ion milling of the back edges 50 and 52 of the sensor layers 26 does not cut through the leads. The leads have a lead height $LH_0$, measured from the dashed line 3—3 that will be the approximate location of the media-facing surface, of about 50–100 microns.

After forming the back edges 50 and 52, another read gap layer, not shown, is formed over the sensor layers 26 and lead layer 44 shown in FIG. 3. A magnetic shield layer that may optionally serve as a write pole layer, not shown, is then formed. After optional formation of a write transducer, not shown, the wafer 20 upon which perhaps a thousand of these sensors has been formed is diced into rows of sensors, one of the rows diced along the dashed line 3—3. The structure shown in FIG. 4 is symmetrical about line 3—3, so that a pair of sensors may be formed upon cutting along that line 3—3, each of the sensors having a media-facing surface adjacent to line 3—3. After further processing, including creation of a protective coating on the media-facing surface, the row is divided into individual heads for interaction with a media.

In an effort to increase storage density, the track width $TW_0$ of the sensor layers 26 may be reduced below that current commercially available range of 0.5 micron to 1.0 micron. As the track width $TW_0$ is reduced, however, the undercut used in the lift off process may become a larger fraction of the mask width, so that the lower mask layer 27 can no longer support the upper layer 28. Moreover, reducing the width of mask 25 below 0.5 micron approaches the limits of conventional photolithography.

SUMMARY

In accordance with the present invention, methods are disclosed for reducing feature sizes of devices such as electromagnetic sensors. A track width of such a sensor may be defined by a mask having an upper layer with a reduced width and a lower layer with a further reduced width. Instead of or in addition to being supported by the lower layer in the area defining the sensor, the upper layer is supported by the lower layer in areas that do not define the sensor width. In some embodiments the upper layer forms a bridge mask, supported at its ends by the lower layer, and the lower layer is completely removed over an area that will become a sensor. Also advantageous is a mask having more than two layers, with a bottom layer completely removed over the sensor area, and a middle layer undercut relative to a top layer.

DETAILED DESCRIPTION OF THE PREFERRED EMBODIMENTS

Figure 1:
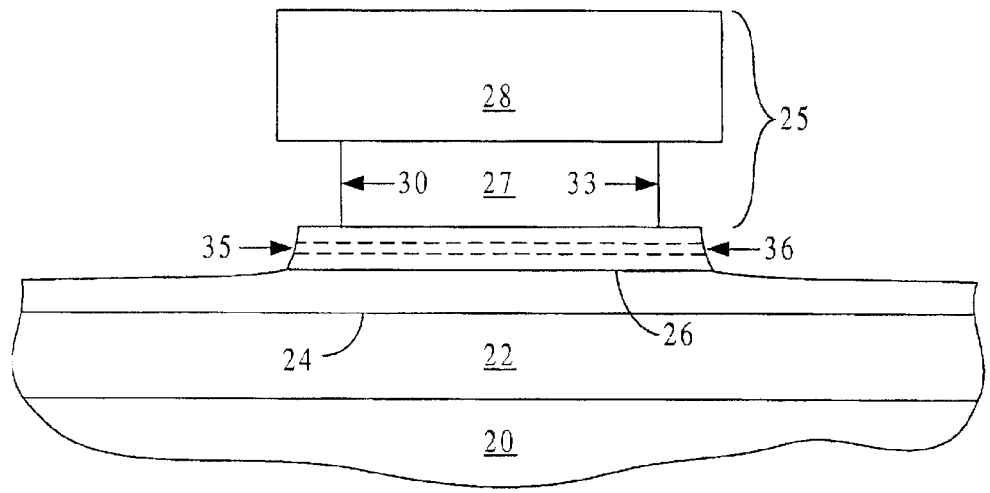
FIG. 1 is a cross-sectional view of a step in the formation of a conventional MR sensor.
Figure 2:
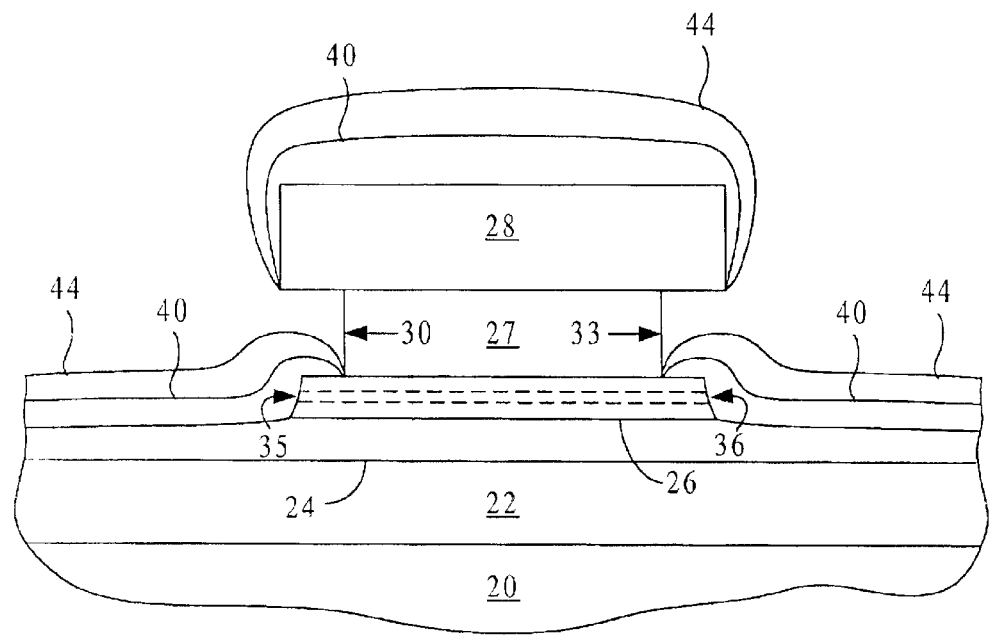
FIG. 2 is a cross-sectional view of a step in the formation of the conventional MR sensor subsequent to that shown in FIG. 1.
Figure 3:
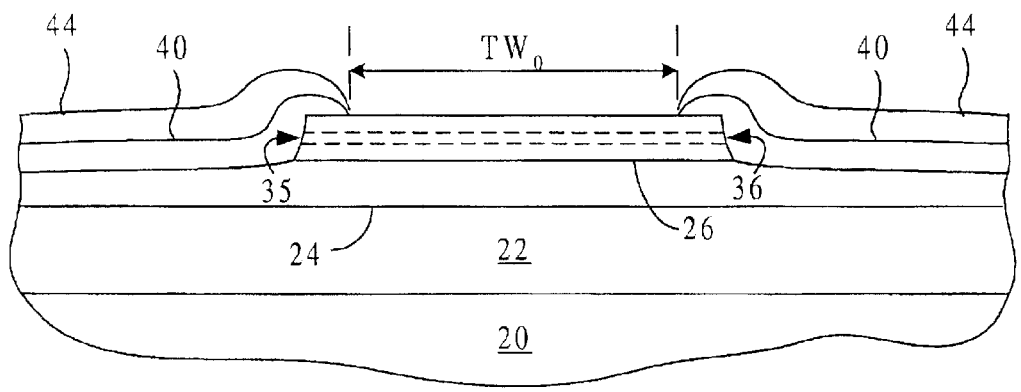
FIG. 3 is a cross-sectional view of a step in the formation of the conventional MR sensor subsequent to that shown in FIG. 2.
Figure 4:
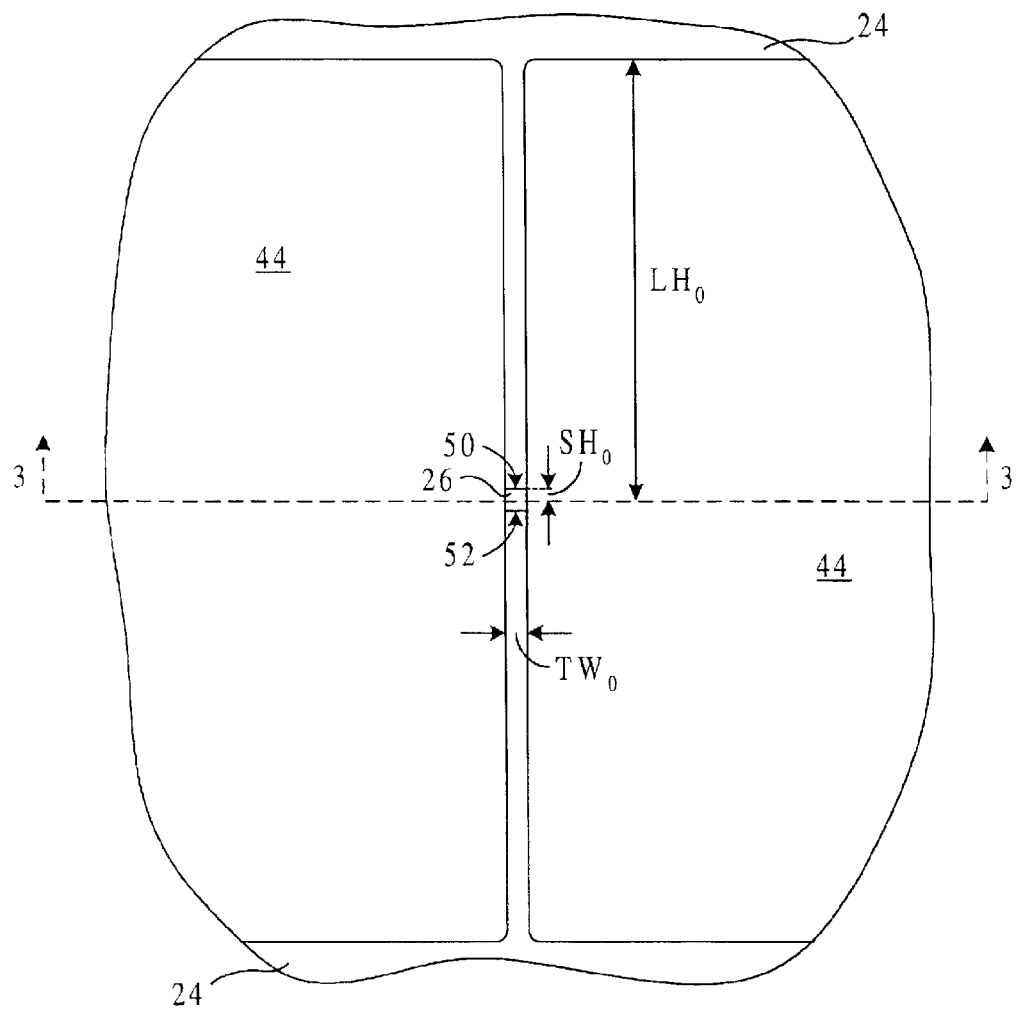
FIG. 4 is a top view of the step in the formation of the conventional MR sensor shown in FIG. 3.
Figure 5:
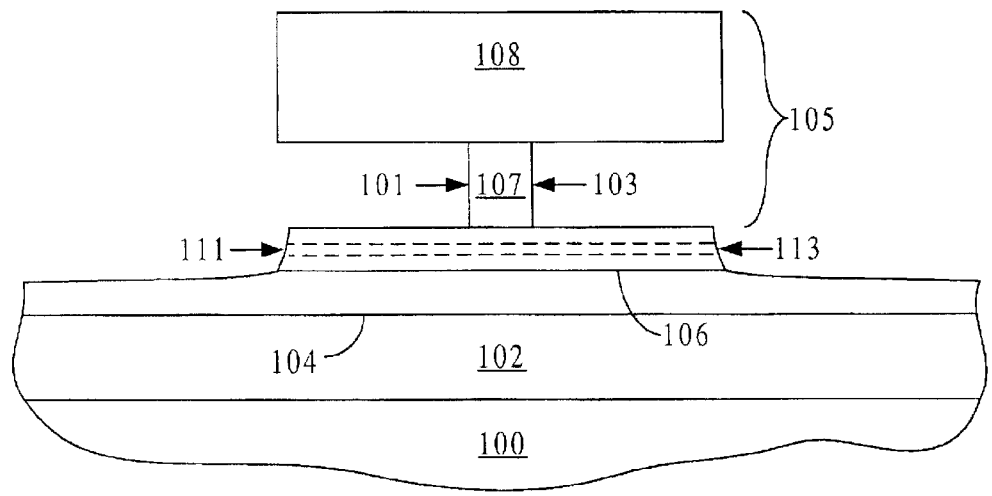
FIG. 5 is a cross-sectional view of a partially completed MR sensor in accordance with the present invention.

FIG. 5 is a cross-sectional view of a partially completed MR sensor in accordance with the present invention. Over a wafer substrate 100 a magnetic shield layer 102 has been formed, either directly on the substrate or on an intermediate layer, not shown. Atop the shield layer 102 a first read gap layer 104 of dielectric materials has been formed, and atop the read gap layer a plurality of magnetoresistive (MR) sensor layers 106 has been formed.

The sensor layers 106 may form a spin valve sensor that includes a pinning layer that stabilizes a magnetic moment of a pinned layer, the pinned layer being separated from a free layer by a nonmagnetic spacer layer, the free layer having a magnetic moment that can vary in response to an applied field. The pinning layer may be formed of an antiferromagnetic material, synthetic antiferromagnet, or current carrying conductor. The pinned and free layers may be formed of ferromagnetic materials such as nickel-iron (NiFe), or half metallic magnet materials such chromium-oxide ($CrO_2$) or iron-oxide ($Fe_3O_4$), and possible antiferromagnetic materials include PtMn, NiMn, PtNiMn and PtCrMn. The spacer layer may be an electrically conductive material such as copper (Cu) or gold (Au). Alternatively, the sensor layers 106 can represent any known MR sensing mechanism that can be formed in accordance with the present invention, including anisotropic, giant and colossal magnetoresistive mechanisms. More generally, sensor layers 106 represent active layers through which electromagnetic transport of electrons or photons is used to sense, store or provide information in an electromagnetic device.

A mask 105 has been formed of a lower layer 107 and an upper layer 108 and, after photolithographic patterning, layer 107 has been chemically removed relative to layer 108, forming undercut edges 101 and 103. The lower layer 107 has a width between edges 101 and 103 that is greatly reduced compared to the prior art as well as being much smaller than that of upper layer 108. Whereas prior art undercut masks would be expected to collapse if a width of a lower layer was less than a sum of the undercut distances, the lower layer 107 can have a width that is less than half that of the upper layer 108. A directional removal step such as ion beam etching (IBE) has been performed to create edges 111 and 113 of the sensor layers 106, the IBE also removing part of the read gap layer 104.

Figure 6:
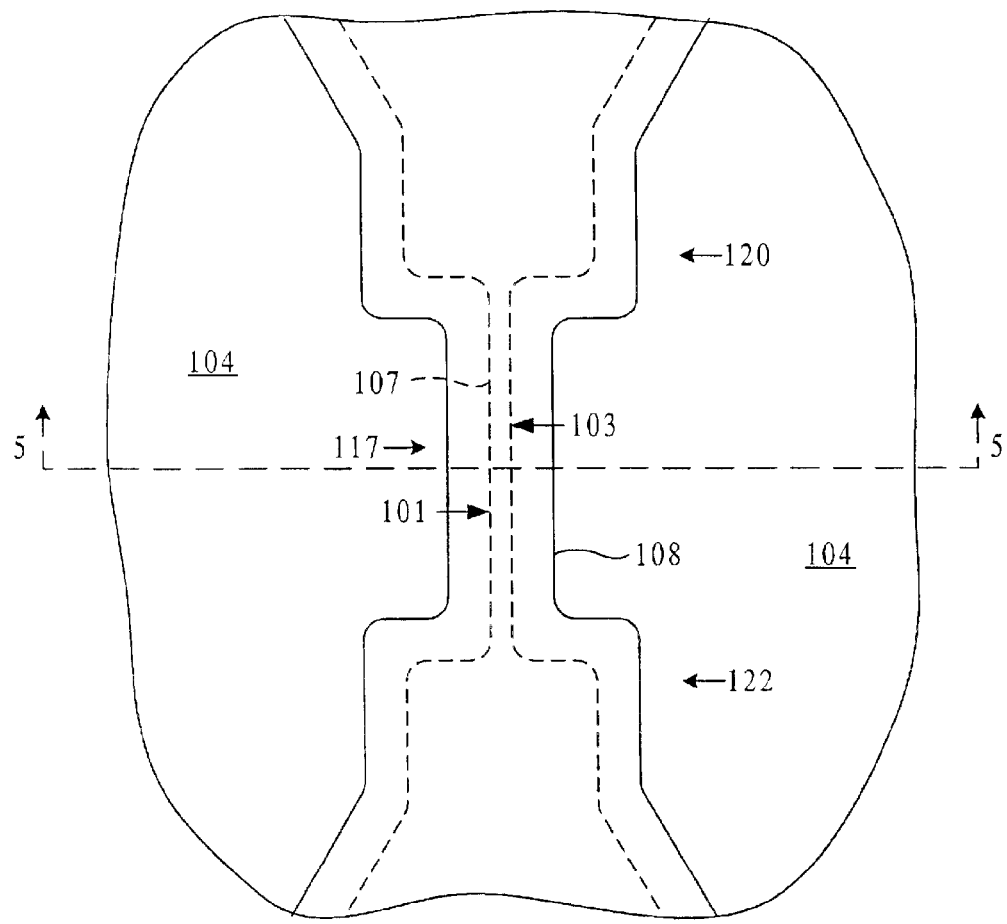
FIG. 6 is a top view of the partially completed MR sensor shown in FIG. 5.

FIG. 6 is a top view of the partially completed MR sensor shown in FIG. 5. As shown in FIG. 6, the lower mask layer 107 can be significantly smaller in sensor area 117 because it is significantly wider in adjacent support areas 120 and 122. Thicker areas 120 and 122 of the lower mask 107 may be separated from each other by about 10 microns or less, allowing a thinner area 117 of that mask to have a width of less than one-quarter micron. The hourglass shaped patterns of mask layers 107 and 108 are in contrast to conventional masks that typically extend in straight lines at least 50 microns from lines that will be cut and formed into media-facing surfaces.

Mask layer 107 in this embodiment contains polydimethylglutarimide (PMGI) underlayer material, although other photo insensitive organic materials that are soluble in developers may alternatively be employed. Patterned photoresist layer 108 may be formed from any of several photoresist materials as are conventional in the art of MR sensor element fabrication. Such photoresist materials may be selected from photoresist materials including positive photoresist materials and negative photoresist materials.

Figure 7:
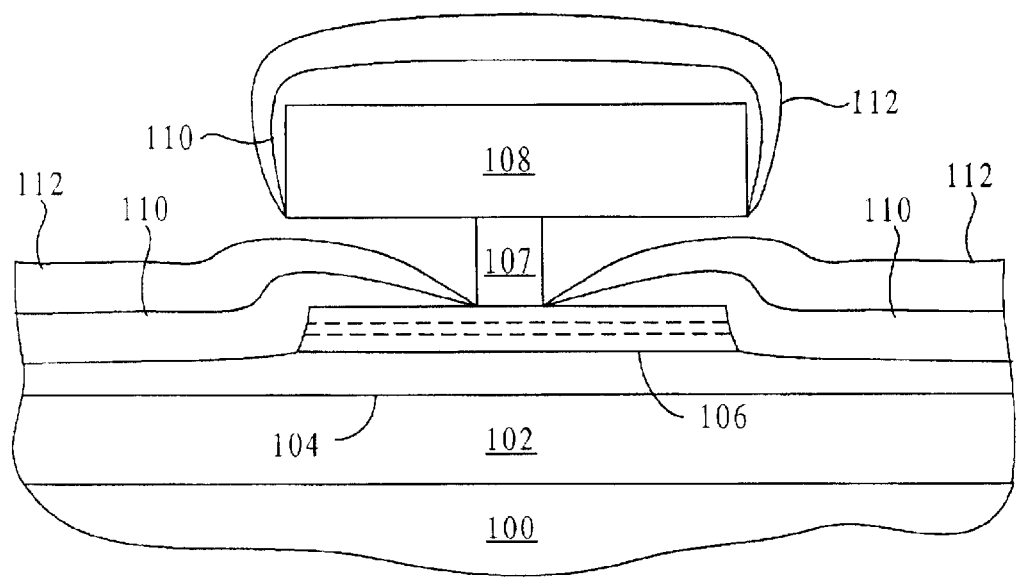
FIG. 7 is a cross-sectional view of a step in the formation of the MR sensor subsequent to that shown in FIG. 5.

FIG. 7 is a cross-sectional view of a step in the formation of the MR sensor subsequent to that shown in FIG. 5. An electrically conductive layer 110 of hard magnetic bias material is deposited on the sensor layers 106, read gap 104 and upper mask 108, to provide longitudinal magnetic bias to the sensor layers 106. An electrically conductive lead layer 112 is then deposited on the bias layer 110, so that the bias layer and lead layer together form electrical leads for flowing current through the sensor layers 106.

Figure 8:
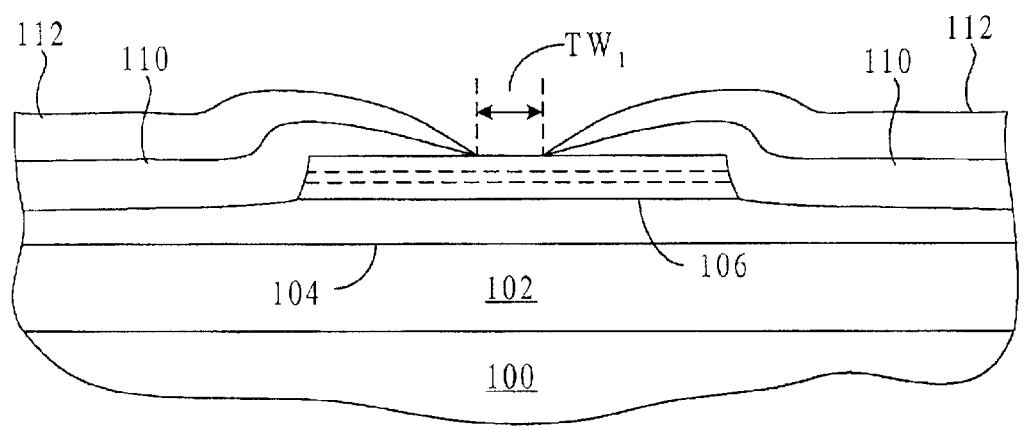
FIG. 8 is a cross-sectional view of a step in the formation of the MR sensor subsequent to that shown in FIG. 7.

FIG. 8 is a cross-sectional view of a step in the formation of the conventional MR sensor subsequent to that shown in FIG. 7. In FIG. 8, the mask layers 107 and 108 have been removed by dissolving at least the lower mask layer 107 with a known solvent. The bias layers 110 and lead layers 112 together form metallic electrical leads for the sensor layers 106. The electrical leads are separated, in this embodiment, by a space left by mask 107, that distance between the electrical leads forming the active width or track width $TW_1$ of the sensor.

Figure 9:
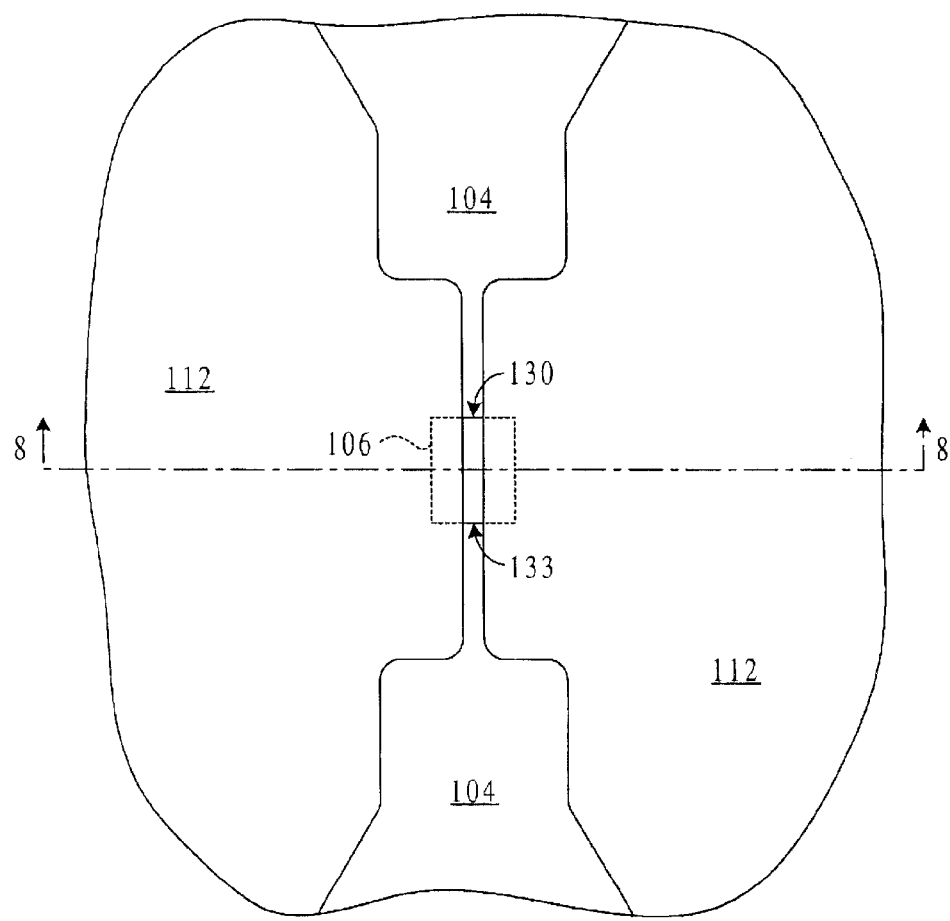
FIG. 9 is a top view of the partially completed MR sensor shown in FIG. 8.

FIG. 9 is a top view of the partially completed MR sensor shown in FIG. 8. Sensor layers 106 have been terminated at back edges 130 and 133 by masking and IBE, not shown, exposing read gap 104 but not cutting through lead layers 112. Cross-sectional line 8—8 shows the location at which the wafer substrate and thin film layers will be diced after completion of wafer level processing.

Figure 10:
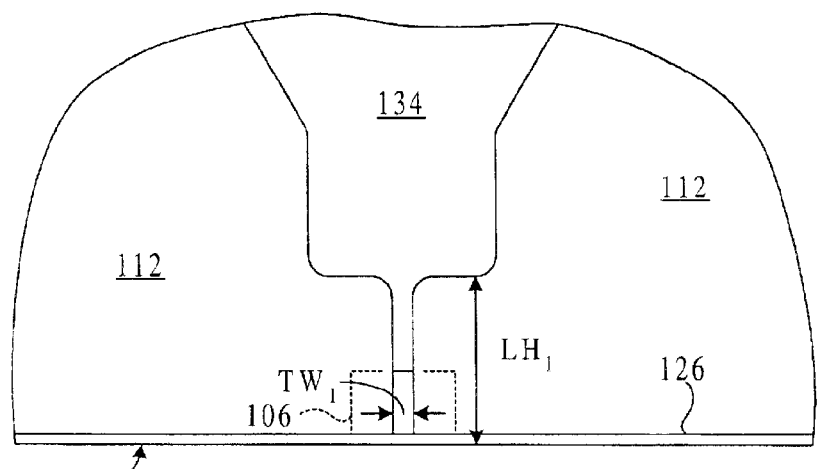
FIG. 10 is a cross-sectional view of a completed MR sensor formed from the partially completed MR sensor shown in FIG. 9.

FIG. 10 is a cross-sectional view of the layers shown in FIG. 9, after subsequent processing including formation of additional layers and dicing of the wafer substrate and thin film layers. The layers have been polished along the diced surface and a hard coating 126, for example made of diamond-like carbon (DLC), has been applied to create a media-facing surface 128. Another read gap layer 134 of dielectric material such as alumina has been deposited atop the read gap 104, not shown in this cross-sectional view. Read gap layer 134 has an area between the leads that is shaped like a profile of a wineglass adjacent the sensor layers 106. Note that the lead layers could extend instead in other shapes provided that within about ten microns of the media-facing surface 128 they are further separated from each other than they are adjacent the media-facing surface 128. For example, instead of the leads each having an edge distal to the media-facing surface that has a serpentine shape, the edge may have a single bend. The lead layers 112 in this cross-section have a lead height $LH_1$ from the media-facing surface 128 that is less than ten microns for portions of the leads that are separated from an edge of the track width $TW_1$ by less than two microns. Lead height $LH_1$ may be is less than about five microns for sections of the leads that are separated from an edge of the track width $TW_1$ by less than one micron.

Figure 11:
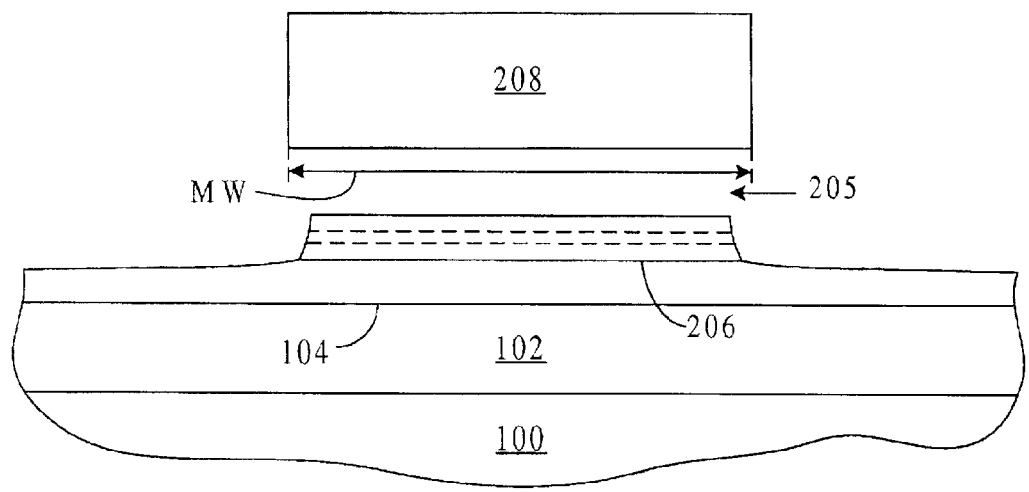
FIG. 11 is a cross-sectional view of a step in the formation of a MR sensor in accordance with the present invention, including a mask that has been completely undercut in the illustrated cross-section.

FIG. 11 is a cross-sectional view of a step in forming another embodiment of a MR sensor in accordance with the present invention. Substrate 100, shield layer 102 and read gap layer 104 may be substantially as previously described. In this embodiment, however, a mask 208 is suspended above the sensor layers 206, separated by a void 205. The mask 208 has a mask width MW that is less than one micron and that may be much smaller with use of high-resolution photolithography. The sensor layers 206 have been trimmed by IBE or similar processes.

Figure 12:
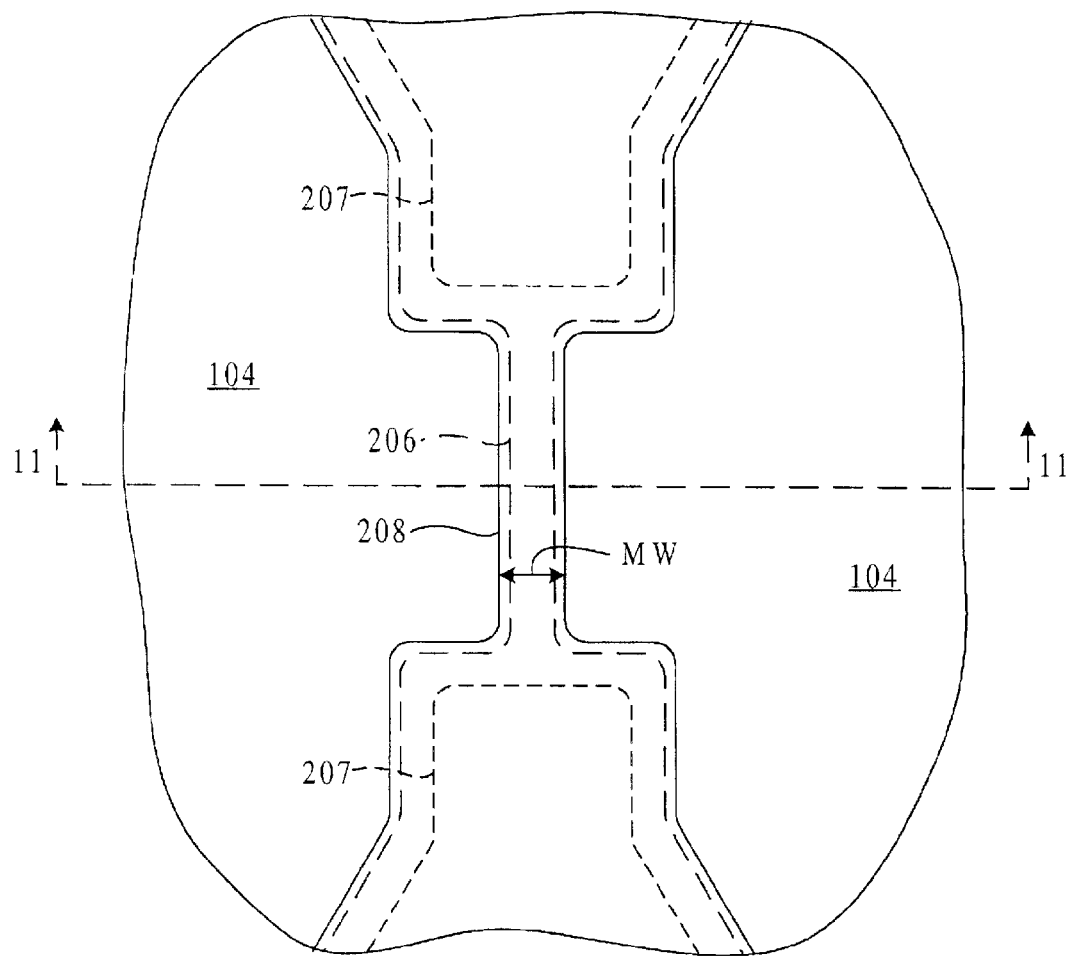
FIG. 12 is a top view of the partially completed MR sensor shown in FIG. 11.

As shown in FIG. 12, lower layer supports 207 allow mask 208 to be suspended over the sensor layers like a bridge in the vicinity of line 11—11.

Figure 13:
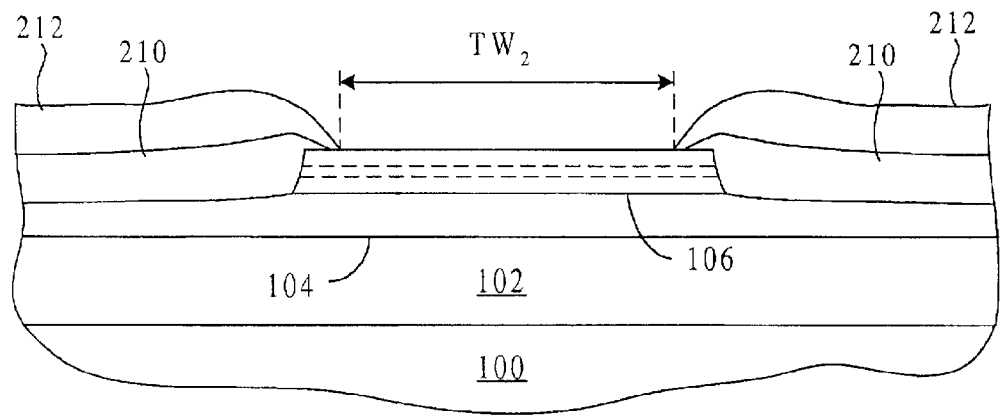
FIG. 13 is a cross-sectional view of a step in the formation of the MR sensor subsequent to that shown in FIG. 11.

FIG. 13 shows a later step in the processing of the sensor shown in FIG. 11 and FIG. 12. A hard bias layer 210 has been deposited, followed by an electrically conductive layer 212, after which the masks 207 and 208 and any overlying bias or conductive materials have been lifted off. A track width $TW_2$ of the sensor layers 206 may, similar to that of the previous embodiment, be in a range between a micron and a nanometer. Reliability and manufacturing yield may be improved, since the exact amount of undercut of the lower mask layer 207 is not critical to the track width $TW_2$.

Figure 14:
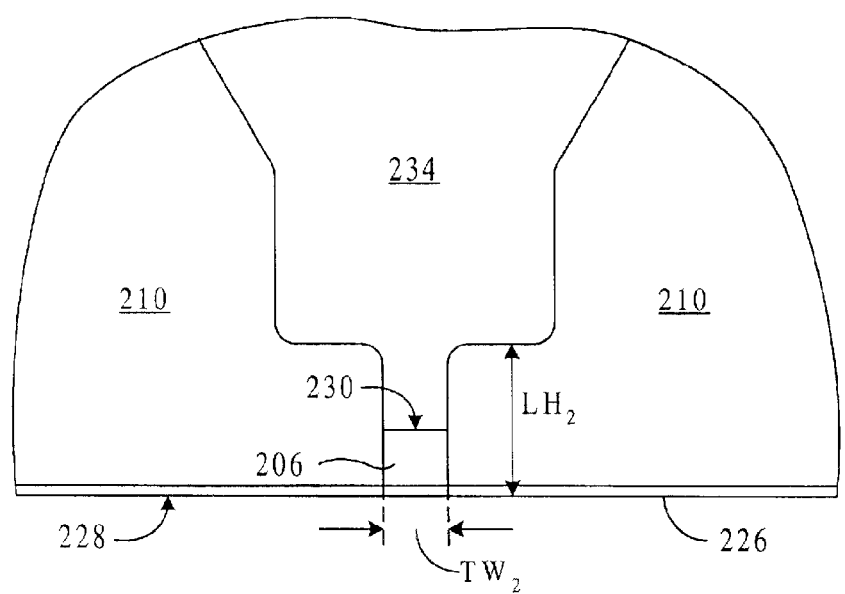
FIG. 14 is a cross-sectional view of a completed MR sensor formed from the partially completed MR sensor shown in FIG. 13.

FIG. 14 is a cross-sectional view of the layers shown in FIG. 13, after subsequent processing including formation of additional layers and dicing of the wafer substrate and thin film layers. The layers have been polished along the diced surface and a hard coating 226, for example made of diamond-like carbon (DLC), has been applied to create a media-facing surface 228. The sensor layers 206 have been ion milled along a back edge 230, which in this embodiment has not cut through the bias layers 210.

Another read gap layer 234 of dielectric material such as alumina has been deposited atop the read gap 104, read gap 104 not being visible in this cross-sectional view. Read gap layer 234 has a wineglass shape adjacent the sensor layers 206, visible between the bias layers 210. Other shapes for the border between read gap 234 and the leads such as bias layers 210 are possible, provided that the leads are further separated than the track width $TW_2$ within several microns of the media-facing surface 228, as a remnant of the support for the bridge-like mask. Depending upon factors such as the thickness of the bias layers 210, the lead layer portion 212 of the electrical leads may instead be disposed in the cross-section shown in FIG. 14. Metallic leads such as bias layers 210 have a lead height $LH_2$ from the media-facing surface that is less than ten microns and preferably less than about five microns when measured in an area beyond the track width $TW_2$ but within about a micron of the center of the track width $TW_2$.

Figure 15:
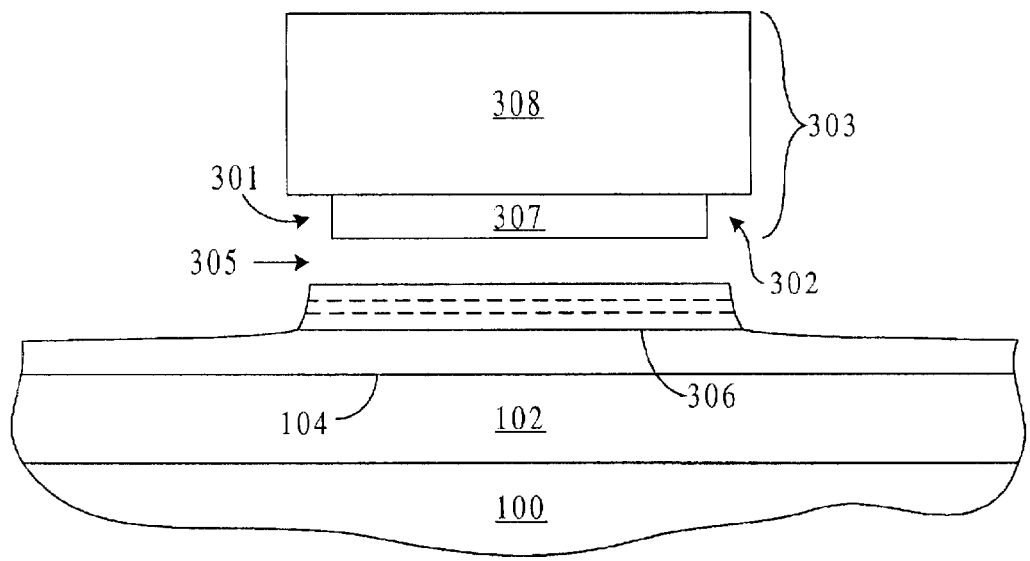
FIG. 15 is a cross-sectional view of a step in the formation of a MR sensor in accordance with the present invention, including a mask that has been completely undercut and notched in the illustrated cross-section.

FIG. 15 is a cross-sectional view of a step in forming another embodiment of a MR sensor in accordance with the present invention. Substrate 100, shield layer 102 and read gap layer 104 may be substantially as previously described. In this embodiment, however, a notched mask 303 including mask layers 307 and 308 is suspended above the sensor layers 306, separated from the sensor layers 306 by an air gap 305.

The sensor layers 306 have been trimmed by IBE or similar processes. Notches 301 and 302 in mask 303 obstruct materials that are removed during IBE from being redeposited on the sensor layers 306, as such redeposition can be harmful to operation of the sensor. That is, migration of redeposition materials over the sensor layers 306 is a function of a height to width aspect ratio of the air gap 305. If the height of air gap 305 is reduced to prevent migration, however, subsequent deposition of bias and lead layers may envelop mask 303, preventing lift off. Notches 301 and 302 allow the subsequent lift off, even when the height of the air gap 305 is reduced.

Notched mask 303 may be created, for example, using three or more mask layers atop sensor layers 306, with a lower layer, not shown, that is removed at a greater rate than a middle layer 307. AS an example, mask layer 308 may be formed of negative or positive photoresist that has a thickness in a range between about 0.3 micron and 0.6 micron, and a width in a range between about 0.1 micron and 1.0 micron.

Layer 307, which for a positive photoresist 308 may be formed for example of inorganic materials such as AlN or $Cu_2O$, may have a thickness in a range between about 0.02 micron and 0.1 micron. Air gap 305 in this case may have been formed with a 0.02 micron to 0.1 micron thick layer of PMGI, which was dissolved away in developer such as KOH that also removed some of layer 307.

Alternatively for a positive photoresist layer 308, layer 307 may be formed of an inorganic material such as a silicon-oxy-nitride ($SiO_xN_y$), silicon oxide (SiO), silicon (Si) or hard carbon (C) materials that are removed by a reactive ion etch (RIE) that also removes the PMGI layer to form the air gap 305. Deposition of inorganic layer 307 may be performed by sputter deposition, ion beam deposition, chemical vapor deposition or other known means for forming inorganic materials. $CF_4O_2$ RIE of the inorganic layer 307 may be accomplished with $CF_4O_2$ for silicon based materials, or pressurized oxygen for carbon based materials, followed by a wet etch.

For the situation in which a negative photoresist is used for layer 308 the entire mask 303 may be formed for example of a layer of organic materials, deposited atop a PMGI layer that is removed to form the air gap 305. The notches 301 and 302 in this case may be formed as a result of photolithographic exposure, with the PMGI layer removed by solvent.

Another way to provide mask layers having different removal rates is to form the lower layer and the middle layer 307 with different concentrations of PMGI. Then, after photolithographic definition of photoresist layer 308, which may be a negative or positive photoresist, solvent is applied that completely removes the lower layer from this cross-section, and undercuts layer 307 relative to layer 308. Although not shown in this cross-section, middle layer 307 and upper layer 308 are supported elsewhere, allowing mask 303 to be suspended over the sensor layers like a bridge.

Figure 16:
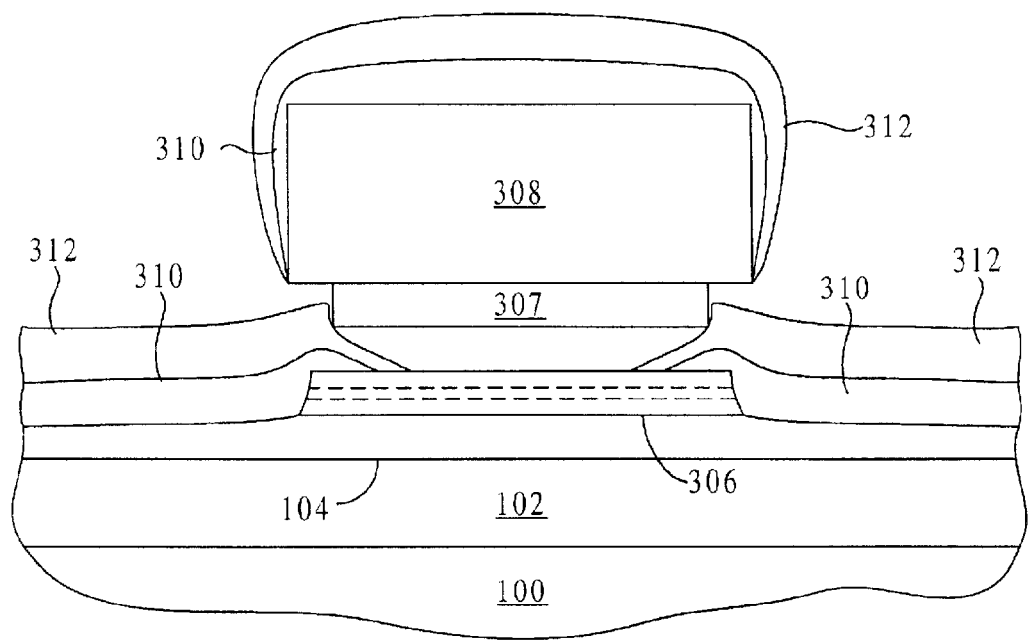
FIG. 16 is a cross-sectional view of a step in the formation of the MR sensor subsequent to that shown in FIG. 15.

FIG. 16 shows a later step in the processing of the sensor shown in FIG. 15. An electrically conductive bias layer 310 has been deposited, followed by an electrically conductive lead layer 312. An advantage of using the notched mask 303 is that electrical leads such as bias layer 310 and electrically conductive layer 312 may be formed with a reduced possibility that they will completely envelope the mask 303, which would prevent lift off.

Figure 17:
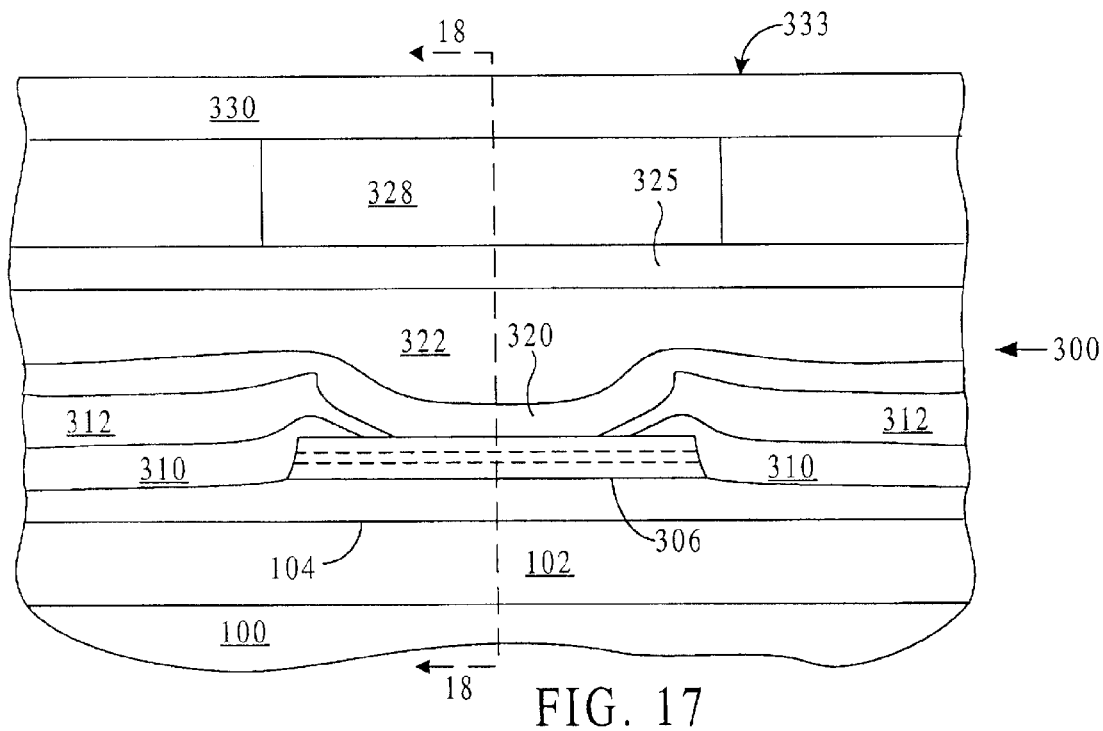
FIG. 17 is a cross-sectional view of a completed MR sensor formed from the partially completed MR sensor shown in FIG. 16, as seen from a cross-section adjacent a media-facing surface.
Figure 18:
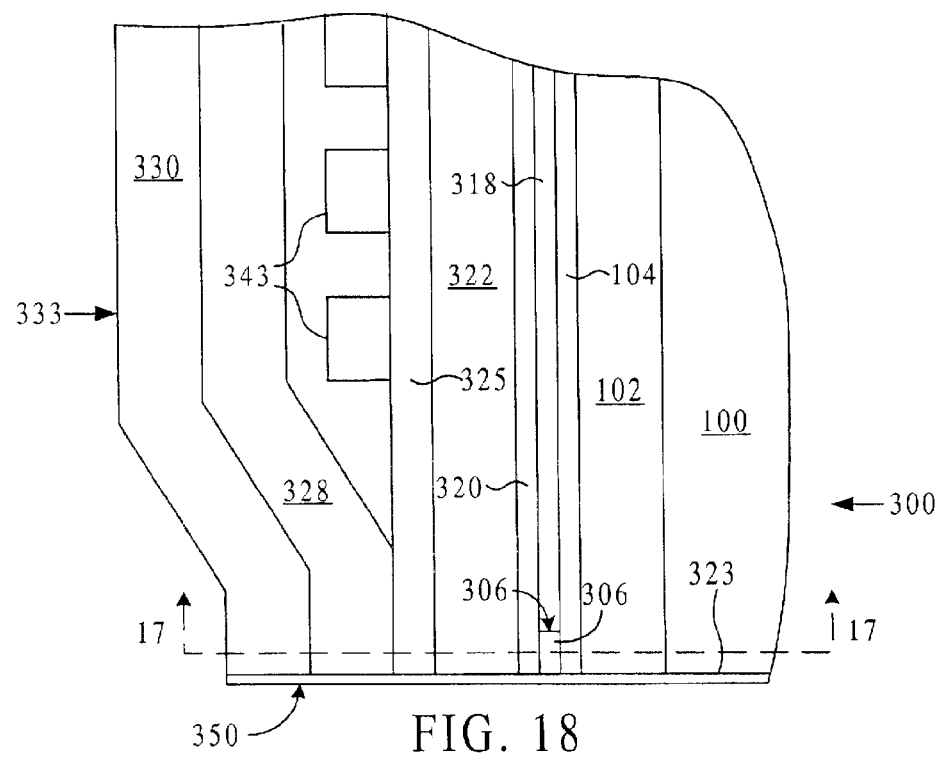
FIG. 18 is another cross-sectional view of the completed MR sensor of FIG. 16, as seen from a cross-section orthogonal to that shown in FIG. 17.

FIG. 17 and FIG. 18 show cross-sections of a completed MR sensor 300 in accordance with the present invention, formed with the partially completed sensor shown in FIG. 16. After the masks 307 and 308 and any overlying bias or conductive materials shown in FIG. 16 are lifted off, masking and IBE defines a back edge 315 of the sensor layers 306. A back gap layer 318 of electrically insulating material may optionally be formed while the sensor layers are still masked. A track width of the sensor layers 306 may, similar to that of the previous embodiment, be in a range between a micron and a nanometer.

Atop the sensor layers 306 and leads 312 a second read gap layer 320 is formed, followed by a second magnetically permeable shield layer 322 that also serves as a first pole layer for an inductive transducer that is used for recording data on a media, not shown. After polishing the shield/pole layer 322 a non magnetic recording gap layer 325 is formed, followed by an electrically conductive coil layer 343, which is surrounded with electrically insulating material. A second magnetically permeable pole layer 328 for the inductive transducer is then formed, surrounded by electrically insulating material. A protective layer 330 is then formed that will define a trailing end 333 of a read/write head including sensor 300. The wafer substrate 100 and adjoining thin film layers is then diced and polished in the vicinity of the cross-section shown in FIG. 17, and another protective coating 323 is applied to form a media-facing surface 350 shown in FIG. 18.

Alternatively, sensors in accordance with the present invention can be formed with lead structures that are created prior to sensor layers, using an undercut, bridge or notched mask as described above.

Figure 19:
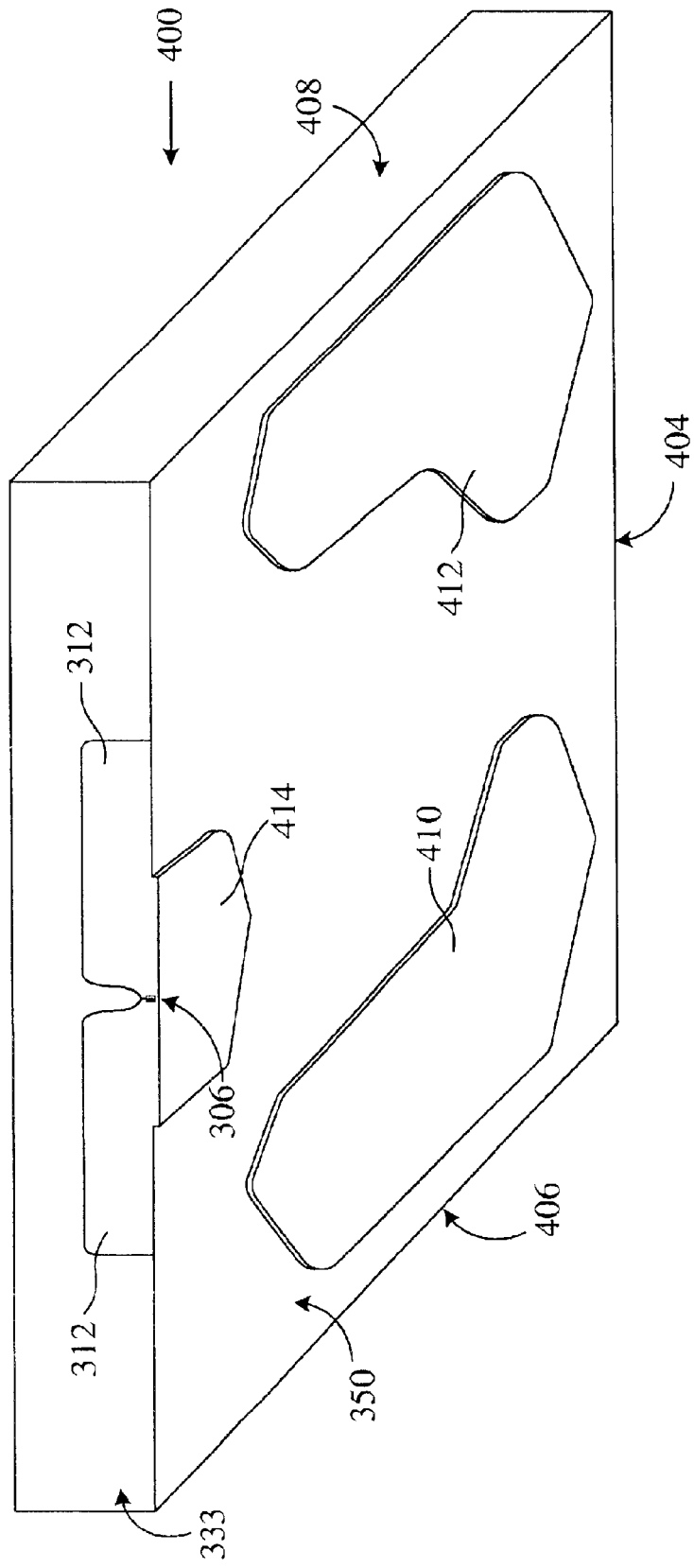
FIG. 19 is a perspective view of a head including the MR sensor of FIG. 17 and FIG. 18, that has been opened to reveal the lead layers.

FIG. 19 shows a perspective view of a head 400 containing the MR sensor 300 of FIG. 17 and FIG. 18. The head 400 has been polished on the trailing end 333 to expose lead layers 312, removing a number of the functional layers that are shown in FIG. 17 and FIG. 18. The head has a leading end 404 separated from the trailing end 333, and a pair of sides 406 and 408. The media-facing surface 350 has a plurality of air-bearing pads 410, 412 and 414 in this embodiment, with the sensor layers 306 disposed adjacent trailing pad 414.

The leads 312 are close together adjacent to the media-facing surface 350, separated by the track width, and further apart a few microns from the media-facing surface. Stated differently, a height of the leads adjacent to a center of the sensor track width is much less than the height of the leads at least five microns away from the center of the sensor track width.

Although the above description has focused on illustrating the formation of an electromagnetic sensor, other devices can be formed in accordance with the present invention. For example, an undercut, bridge or notched mask as described above can be employed in a lithographic technique to enable the production of sub-half micron conductive or nonconductive patterns on semiconductor devices such as electronic circuits. Moreover, other embodiments and modifications of this invention will be apparent to persons of ordinary skill in the art in view of these teachings. Therefore, this invention is limited only by the following claims, which include all such embodiments and modifications when viewed in conjunction with the above specification and accompanying drawings.

What is claimed is:

1. An electromagnetic device comprising:
    a plurality of adjoining sensor lay disposed adjacent to a media-facing surface,
    a pair of electrically conductive layers disposed adjacent to said media-facing surface and adjoining at least one of said sensor layers,
    wherein said electrically conductive layers are separated from each other by a first distance at a first location adjacent to said media-facing surface, and
    said electrically conductive layers are separated from each other by a second distance at a second location within ten microns of said media-facing surface,
    such that said second distance is at least twice said first distance, and
    said first distance is less than one-quarter micron.
2. The device of claim 1, wherein:
    said second distance is at least four times said first distance.
3. The device of claim 1, wherein:
    said second distance is at least four microns.
4. The device of claim 1, wherein an area between said electrically conductive layers has a shape substantially matching a profile of a wineglass.
5. The device of claim 1, wherein said electrically conductive layers each adjoin a plurality of said sensor layers.
6. The device of claim 1, wherein:
    at least one of said electrically conductive layers has an edge that is removed from said media-facing surface, and
    said edge has a serpentine shape.
7. The device of claim 1, wherein:
    said sensor layers have a first edge disposed adjacent to said media-facing surface and a second edge disposed distal to said media-facing surface,
    said first distance is measured at a location closer to said media-facing surface than said second edge, and
    said second distance is measured at a location further from said media-facing surface than said second edge.
8. The device of claim 1, wherein:
    said sensor layers include a first layer separated from a second layer by a nonmagnetic layer,
    said first layer has a magnetic moment that is variable in response to an applied magnetic field, and
    said second layer has a magnetic moment that is fixed in response to said applied magnetic field.
9. The device of claim 1, wherein said electrically conductive layers are electrical leads.
10. An electromagnetic device comprising:
    a solid body having a leading end separated from a trailing end in a lengthwise direction, a media-facing surface separated from a non-media-facing surface in a heightwise direction, and a pair of sides separated from each other in a widthwise direction,
    a plurality of adjoining sensor layers extending adjacent to said media-facing surface,
    a pair of electrically conductive leads disposed adjacent to said media-facing surface and separated from each other by a track width that is in a range between one-quarter micron and one nanometer, at least one of said leads having a height measured in said heightwise direction,
    wherein said lead height measured at a first location that is distal to said track width is at least twice said lead height measured at a second location that is adjacent to said track width.
11. The device of claim 10, wherein said first electrically conductive lead is magnetic.
12. The device of claim 10, wherein:
    wherein said lead height measured at said first location is at least four times said lead height measured at said second location.

13. The device of claim 10, wherein:
said lead adjoins said sensor layers at said second location and said lead does not adjoin said sensor layers at said first location.

14. The device of claim 10, wherein an area between said leads is shaped like a profile of a wineglass.

15. The device of claim 10, wherein said lead layers have a magnetic moment.

16. The device of claim 10, wherein at least one of said lead layers has an edge that is removed from said media-facing surface and that has a serpentine shape.

17. An electromagnetic device comprising:
a plurality of adjoining sensor layers disposed adjacent to a media-facing surface, one of said sensor layers extending a first distance in a track width direction between two edges, and a pair of electrically conductive layers disposed adjacent to said media-facing surface and adjoining said one sensor layer, said electrically conductive layers separated from each other in the track width direction by a second distance that is less than one-half said first distance, less than two hundred nanometers and more than one nanometer.

18. The device of claim 17, wherein said electrically conductive layers each include a plurality of layers.

19. The device of claim 17, wherein said electrically conductive layers adjoin a plurality of said sensor layers.

20. The device of claim 17, wherein said electrically conductive layers each include a plurality of layers.

* * * * *